US008275173B2

(12) United States Patent
Wu et al.

(10) Patent No.: US 8,275,173 B2
(45) Date of Patent: Sep. 25, 2012

(54) PARKING ASSISTANCE SYSTEM AND METHOD

(75) Inventors: Bing-Fei Wu, Hsinchu (TW); Chao-Jung Chen, Hsinchu (TW); Ying-Han Chen, Hsinchu (TW); Chih-Chung Kao, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 609 days.

(21) Appl. No.: 12/545,932

(22) Filed: Aug. 24, 2009

(65) Prior Publication Data

US 2010/0231416 A1 Sep. 16, 2010

(30) Foreign Application Priority Data

Mar. 10, 2009 (TW) ............................... 98107616 A

(51) Int. Cl.
*G06K 9/00* (2006.01)

(52) U.S. Cl. ..... 382/104; 382/100; 382/232; 340/232.2; 340/436

(58) Field of Classification Search .................. 382/100, 382/104, 232; 340/232.2, 436; 348/118, 348/148, 333.02, 143; 701/28, 36, 42
See application file for complete search history.

(56) References Cited

U.S. PATENT DOCUMENTS 8,098,173 B2 * 1/2012 Hueppauff et al. ........ 340/932.2
2004/0204807 A1 * 10/2004 Kimura et al. .................. 701/36
2008/0158011 A1 * 7/2008 Yamanaka ................. 340/932.2

* cited by examiner

*Primary Examiner* — Ali Bayat
(74) *Attorney, Agent, or Firm* — WPAT., P.C.; Justin King

(57) ABSTRACT

A parking assistance system (PAS) comprising an image capture device, a display device and an image analysis device is provided, wherein the image capture device captures a rear parking image of a car and the image analysis device analyses the parking image to determine an initial line, two side lines and an auxiliary line in the parking image. The image analysis device determines a first reference point according to a specific position on the car, a second reference point according to an interval of the initial line between the two side lines, a third reference point according to an interval of the auxiliary line between the two side lines and a recommended parking path according to these reference points, and transmits the parking image and the recommended parking path to the display device, such that the parking image and the recommended parking path are superimposed to be displayed on the display.

35 Claims, 12 Drawing Sheets

100

PARKING ASSISTANCE SYSTEM AND METHOD

FIELD OF THE INVENTION

The present invention generally relates to a parking assistance system and a method thereof and, more particularly, to a parking assistance system and a parking assistance method capable of providing a recommended parking path.

BACKGROUND OF THE INVENTION

Cars have been one of the best choices when it comes to means of transportation. When a destination is reached, the car has to be parked. Generally, it is more difficult to park than drive. As a result, it is very likely to cause a fender-bender when the car is parking backward or along the roadside.

Nowadays, some cars are equipped with parking sensors so that an alarm can be issued when a car is moving towards some objects. Some cars are further equipped with display devices to display the rear parking image. Such parking sensors and display devices are useful to prevent cars from collision only when a car is parking backward. However, these devices still fail to help drivers with poor skills to avoid a fender-bender.

Moreover, in some conventional arts, a parking assistance system comprising a plurality of sensors may be installed on the body or the steering wheel of the car so that the sensors are able to detect the surrounding environment and the steering angle to determine the optimal parking instructions and assist the driver to park. However, such sensors are generally expensive, which raises the cost of the cars with such a parking assistance system.

SUMMARY OF THE INVENTION

It is one object of the present invention to provide a parking assistance system capable of displaying a recommended parking path in a parking image to assist the driver to park.

It is another object of the present invention to provide a parking assistance method capable of providing a recommended parking path by capturing and analyzing a parking image with low cost.

In order to achieve the foregoing or other objects, the present invention provides a parking assistance system for being equipped on a car, the parking assistance system comprising: an image capture device disposed on the car to capture at least one parking image from the back of the car; a display device disposed in the car; and an image analysis device coupled to the image capture device and the display device to receive and analyze the parking image to determine an initial line in the parking image and determine two side lines in the parking image according to the initial line, the initial line and the two side lines defining a parking region and at least one auxiliary line being parallel with the initial line and intersecting the two side lines; wherein the image analysis device determines a first reference point according to a specific position on the car, a second reference point according to an interval of the initial line between the two side lines, at least one third reference point according to an interval of the auxiliary line between the two side lines and a recommended parking path according to the first reference point, the second reference point and the third reference point, and transmits the parking image and the recommended parking path to the display device, so that the parking image and the recommended parking path are superimposed to be displayed on the display.

In order to achieve the foregoing or other objects, the present invention further provides a parking assistance method, comprising steps of: capturing at least one parking image from the back of a car; determining an initial line in the parking image; determining two side lines in the parking image according to the initial line, the initial line and the two side lines defining a parking region and at least one auxiliary line being parallel with the initial line and intersecting the two side lines; determining a first reference point according to a specific position of the car, a second reference point according to an interval of the initial line between the two side lines and at least one third reference point according to an interval of the auxiliary line between the two side lines; determining a recommended parking path according to the first reference point, the second reference point and the third reference point; and displaying the parking image and the recommended parking path that are superimposed.

In one embodiment of the present invention, the first reference point is located at the image capture device or at the center of a rear wheel shaft of the car, the second reference point is located at the center of the interval of the initial line between the two side lines, and the third reference point is located at the center of the interval of the auxiliary line between the two side lines.

In one embodiment of the present invention, the recommended parking path is a quadratic curve connecting the first reference point, the second reference point and the third reference point.

In one embodiment of the present invention, there are plural auxiliary lines and plural third reference points corresponding thereto, and the recommended parking path is a polynomial curve connecting the first reference point, the second reference point and the plural third reference points or a quadratic curve obtained by curve fitting based on the first reference point, the second reference point and the plural third reference points.

In one embodiment of the present invention, the image analysis device determines a recommended steering angle according to an interval of the recommended parking path adjacent to the first reference point and transforms the recommended steering angle in to a recommended number of steering turns corresponding to the steering wheel of the car. Moreover, the image analysis device transmits the recommended number of steering turns to the display device so that the display device is able to display the recommended number of steering turns.

In one embodiment of the present invention, the interval of the recommended parking path adjacent to the first reference point corresponds to a curvature center, the curvature center and the center of a front wheel shaft of the car defining a steering line, and the recommended steering angle being an included angle between a vertical line to the steering line and a traveling direction of the car.

In one embodiment of the present invention, a steering tangential line is defined at the first reference point on the recommended parking path, the recommended steering angle being an included angle between the steering tangential line and a traveling direction of the car.

In one embodiment of the present invention, a steering normal line is vertical to the initial line at the second reference point, the recommended steering angle being an included angle between the steering normal line and a traveling direction of the car.

In one embodiment of the present invention, there are plural parking image that are time-sequential so that a trajectory curve is defined by feature points in the plural parking images according to time sequence. Moreover, the feature points are intersections where the initial line intersects any of the side lines.

In one embodiment of the present invention, an instantaneous steering tangential line is defined at a nearest feature point on the trajectory curve, and an error steering angle is determined according to the instantaneous steering tangential line.

In one embodiment of the present invention, the image analysis device transforms the error steering angle into a recommended number of adjustment turns corresponding to the steering wheel, and transmits the recommended number of adjustment turns to the display device, so that the display device is able to display the recommended number of adjustment turns.

In one embodiment of the present invention, the step of determining the initial line in the parking image further comprises steps of: detecting a region to be determined that exhibits higher image intensity in the parking image; determining whether there is any edge feature in the region to be determined; and determining whether the region to be determined is a strip and whether the width of the region to be determined is smaller than a specific width. Moreover, the step of detecting the region to be determined that exhibits higher image intensity in the parking image is performed towards the back of the car from a base point, the base point being located at the bottom edge of the parking image.

In one embodiment of the present invention, the step of determining the two side lines in the parking image further comprises steps of: detecting a region to be determined that exhibits higher image intensity in the parking image; determining whether there is any edge feature in the region to be determined; and determining whether the region to be determined is a strip and whether the width of the region to be determined is smaller than a specific width; and determining whether the region to be determined is vertical to the initial line.

Accordingly, in the parking assistance system and method of the present invention, the initial line, the side lines and the imaginary auxiliary line in the parking image are analyzed to determine a recommended parking path corresponding to the position of the car to assist the driver to park. Moreover, the recommended parking path can be further analyzed to derive the recommended number of steering turns and the recommended number of adjustment turns corresponding to the steering wheel.

BRIEF DESCRIPTION OF THE DRAWINGS

The objects and spirits of the embodiments of the present invention will be readily understood by the accompanying drawings and detailed descriptions, wherein.

DETAILED DESCRIPTION OF THE PREFERRED EMBODIMENT

The present invention can be exemplified but not limited by various embodiments as described hereinafter.

Figure 1:
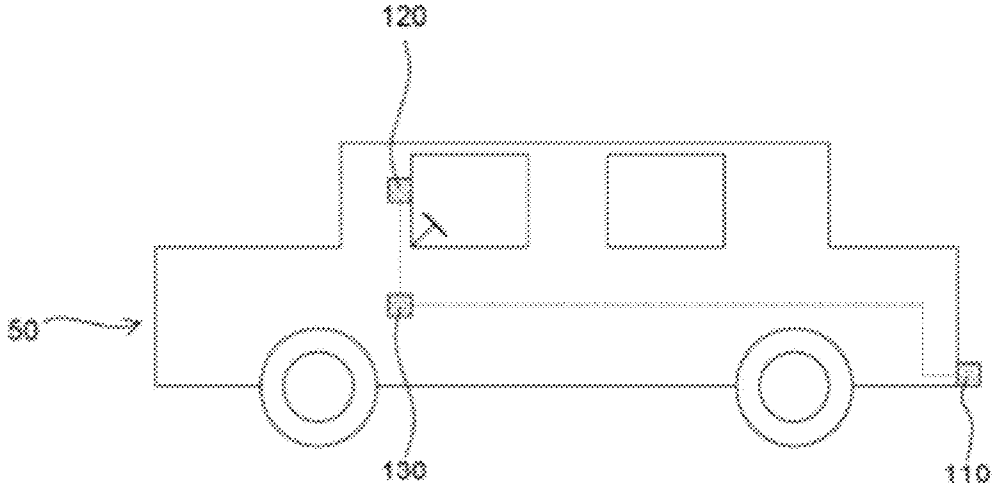
FIG. 1 is a schematic diagram of a parking assistance system according to one embodiment of the present invention.
Figure 2:
FIG. 2 is an actual parking image according to one embodiment of the present invention.

FIG. 1 is a schematic diagram of a parking assistance system according to one embodiment of the present invention. Referring to FIG. 1, the parking assistance system 100 of the present invention is equipped on a car 50 to comprise an image capture device 110, a display device 120 and an image analysis device 130. The image capture device 110 is disposed on car 50 to capture at least one parking image (as shown in FIG. 2) from the back of the car 50. The display device 120 is disposed in the car 50 so that the driver can refer to. The image analysis device 130 is coupled to the image capture device 110 and the display device 120 to receive and analyze the parking image.

Figure 3:
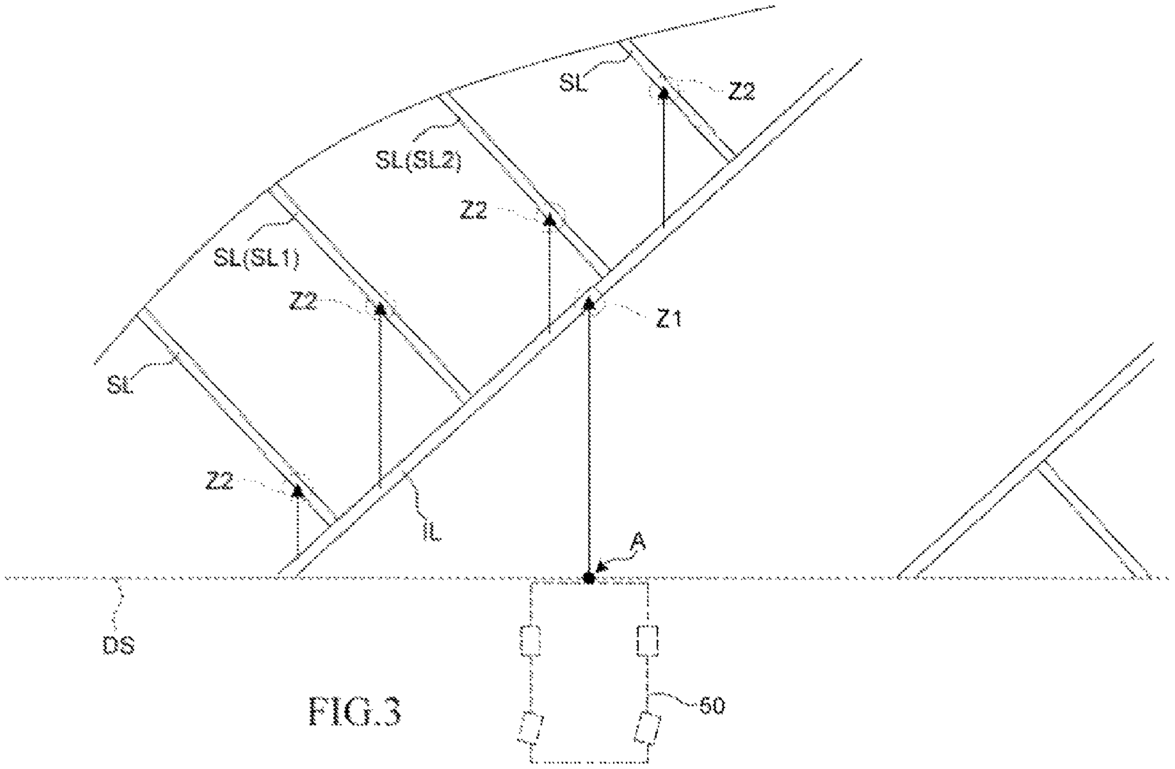
FIGS. 3 to 4' are schematic diagrams of a parking image in a world coordinate system according to one embodiment of the present invention.

In the present embodiment, the image capture device 110 is, for example, fixedly disposed with a slanted angle on the back of the car 50. As a result, the image analysis device 130 performs a coordinate transformation to transform the parking image in the image in FIG. 2 to the parking image in the world coordinate system in FIG. 3. In FIG. 3, only the lines for defining parking regions are shown, for example, the initial line and the side lines. In other words, the parking image in FIG. 2 is a planar representation of a 3-D image. Therefore, in FIG. 2, the object in the upper portion of the parking image looks smaller than it is in the bottom portion. However, the parking image in FIG. 3 is based on an isometric coordinate system and is regarded as a top view.

As stated above, the descriptions herein correspond to the parking image in the world coordinate system in FIG. 3. However, anyone with ordinary skill in the art should understand that the parking image in FIG. 2 and the parking image in FIG. 3 are equivalent except that it is more convenient to perform calculations on the parking image in FIG. 3 while the parking image in FIG. 2 is more intuitional.

Referring to the parking image in FIG. 3, since the image capture device 110 is disposed on the back of the car 50, the center A of the bottom edge in the parking image is regarded as the position where the image capture device 110 is disposed. Certainly, the present invention is not limited to the position of the image capture device 110 because anyone with ordinary skill in the art can shift the coordinate system according to the actual position of the image capture device 110. For better understanding, the point A as the position of the image capture device 110 is exemplary in the present embodiment.

In FIG. 3, the image analysis device 130 receives and analyzes the parking image to determine an initial line IL in the parking image. In image processing, there have been lots of reports on object recognition in an image. In the present embodiment, since the lines for defining the parking regions are usually drawn as white lines, the corresponding regions exhibit higher image intensity. Therefore, in the parking image, a region Z1 to be determined that exhibits higher image intensity can be can be firstly detected.

As stated above, in the present embodiment, the region to be determined that exhibits higher image intensity in the parking image is detected towards the back of the car 50 from a base point located at the bottom edge DS of the parking image. For convenience, in the present embodiment, point A is used as the base point. However, in other embodiment, any point at the bottom edge DS can also be chosen as the base point.

Then, in the present embodiment, the region Z1 to be determined and extended regions therefrom are determined to be the initial line IL for defining the parking region. The region Z1 to be determined is required to be a strip with edge features, and the width of the region Z1 has to be smaller than a specific width. Generally, the width offlines for defining a parking region is about 10 cm. Therefore, the specific width can be determined as 20 cm to exclude unreasonable conditions.

As the region Z1 to be determined meets the aforesaid requirements, the image analysis device 130 is able to determine that the region Z1 is the initial line IL, and further determine side lines SL in the parking image according to the initial line IL. Similarly, in the present embodiment, a region Z2 to be determined that exhibits higher image intensity in the parking image is detected from the plural base points on the initial line IL towards the direction away from the car 50. Then, the region Z2 to be determined and extended regions therefrom are determined to be one of the side lines SL for defining the parking region.

It is noted that, in addition to the aforesaid requirements, it is required to determine whether the region Z2 to be determined and extended regions therefrom are vertical to the initial line IL. Moreover, any two of the determined regions Z2 are separated by a specific distance, for example, larger than 2 meters because the width of a parking region is generally within a range from 2.5 to 3 meters. As a result, the image analysis device 130 is able to determine plural side lines SL. Two neighboring side lines SL and the initial line IL define a parking region. In the present embodiment, these plural side lines SL and the initial line IL define plural parking regions.

Then, the image analysis device 130 may choose a parking region that is relatively closer to the car 50 or the driver may choose any proper parking region by using an interactive manu. In the present embodiment, a parking region defined by the initial line IL and the side lines SL1 and SL2 is chosen to exemplify the present invention.

Figure 4:
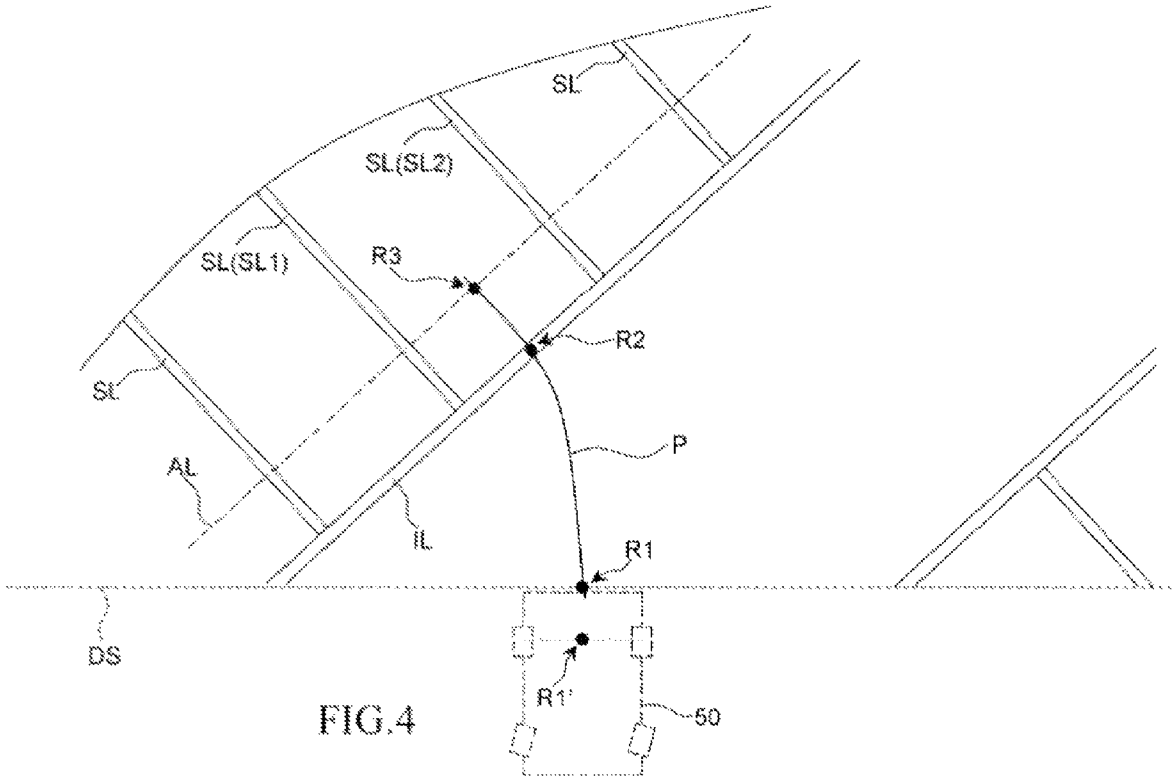
Figure 4:
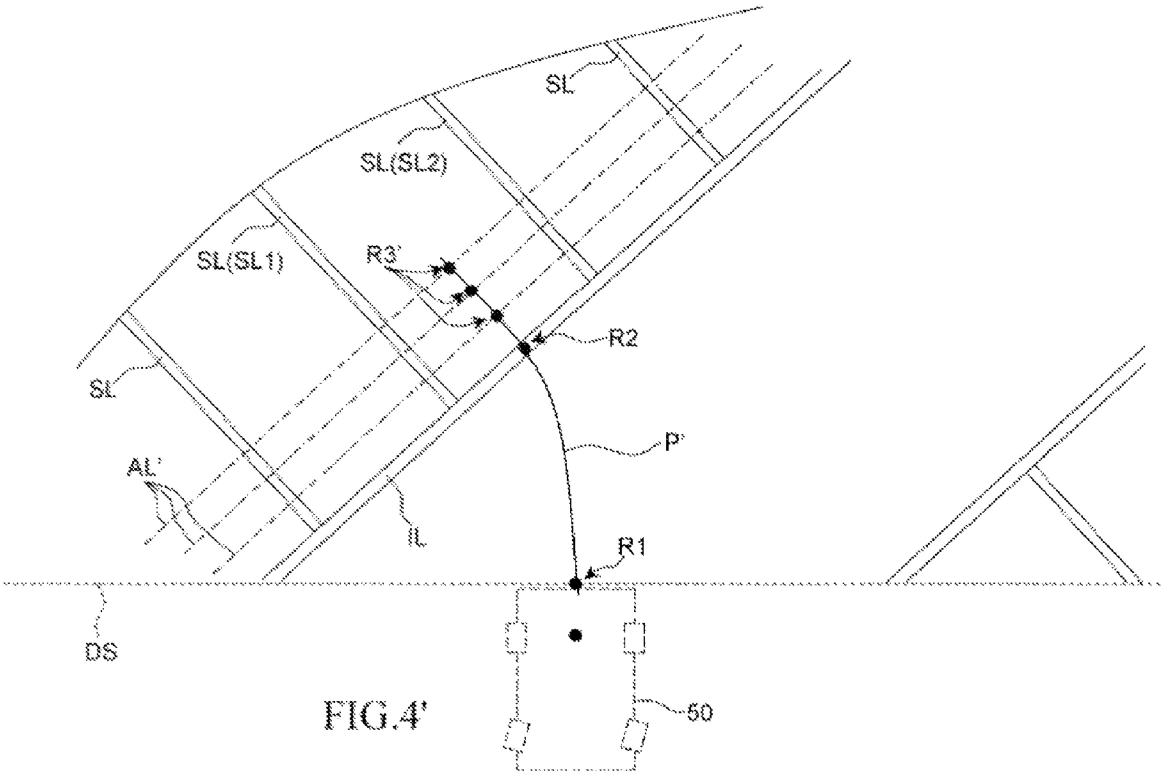

Referring to FIG. 4, as the parking region defined by the initial line IL and the side lines SL1 and SL2 is chosen, the image analysis device 130 will construct a recommended parking path P using the aforesaid information to assist the driver to park. Generally, a curve is determined by at least three reference points. Since the recommended parking path P connects the car 50 and the parking region, the position of the car 50 is regarded as a first reference point R1 the present embodiment. Moreover, a second reference point R2 and a third reference point R3 are determined according to the initial line IL and the side lines SL1 and SL2. Finally, the recommended parking path P can be determined according to the first reference point R1, the second reference point R2 and the third reference point R3.

More particularly, the first reference point R1 is determined according to a specific position of the car 50. In the present embodiment, the first reference point R1 is located at the image capture device 110 disposed on the back of the car 50. However, the present invention is not limited to the position of the first reference point R1. For example, the first reference point R1' can be located at the center of the rear wheel shaft of the car 50 so that the first reference point R1' reflects the state of the car 50 more realistically and is thus more preferably referred to when the car 50 is steering.

Moreover, the second reference point R2 is determined according to an interval of the initial line IL between the side lines SL1 and SL2. Since the first reference point R1 is located on the back of the car 50, the second reference point R2 can be located at the interval center of the initial line IL between the side lines SL1 and SL2. Moreover, the image analysis device 130 uses an imaginary auxiliary line AL to determine the third reference point R3. The auxiliary line AL is parallel with the initial line IL and intersects the side lines SL. Similarly, the third reference point R3 is determined according to an interval of the auxiliary line AL between the side lines SL1 and SL2. Similarly, the third reference point R3 can be located at the interval center of the auxiliary line AL between the side lines SL1 and SL2.

Then, the image analysis device 130 determines the recommended parking path according to the first reference point R1, the second reference point R2 and the third reference point R3. In the present embodiment, recommended parking path P is a quadratic curve connecting the first reference point R1, the second reference point R2 and the third reference point R3. However, the present invention is not limited to the method for determining the recommended parking path P. For example, for higher precision, the image analysis device 130 creates plural imaginary auxiliary lines AL' to provide plural third reference points R3' at the interval centers of the plural auxiliary lines between the side lines SL1 and SL2, as shown in in FIG. 4'. As a result, a recommended parking path P' is constructed as a polynomial curve (with the power larger than 2) connecting the first reference point R1, the second reference point R2 and the plural third reference points R3'. The recommended parking path P' can also be a quadratic curve or polynomial curve (with the power larger than 2) by curve fitting using the minimum squared error method.

During experiments, the present invention is preferably implemented by providing a recommended parking path being a quadratic curve constructed by five points (namely, three third reference points R3', the first reference point R1 and the second reference point R2). More particularly, the recommended parking path passes the first reference point R1 and the second reference point R2 and experiences a minimum squared error calculation with the three third reference points R3'. Any neighboring two of the initial line IL and the three auxiliary lines AL' are separated by 50 cm. For better understanding, the recommended parking path in the embodiment in FIG. 4 is used to exemplify the preset invention herein.

Figure 5:
FIG. 5 is an actual parking image according to one embodiment of the present invention.

Referring to FIG. 4, after the image analysis device 130 determines the recommended parking path P, the image analysis device 130 transmits the parking image and the recommended parking path P to the display device 120 so that the display device 120 is able to display the parking image and the recommended parking path P that are superimposed, as shown in FIG. 5, to assist the driver to park. It is also noted that FIG. 4 and FIG. 5 are parking images in different coordinate systems that are readily understood by anyone with ordinary skill in the art and can be transformed from one coordinate system to the other.

Figure 6:
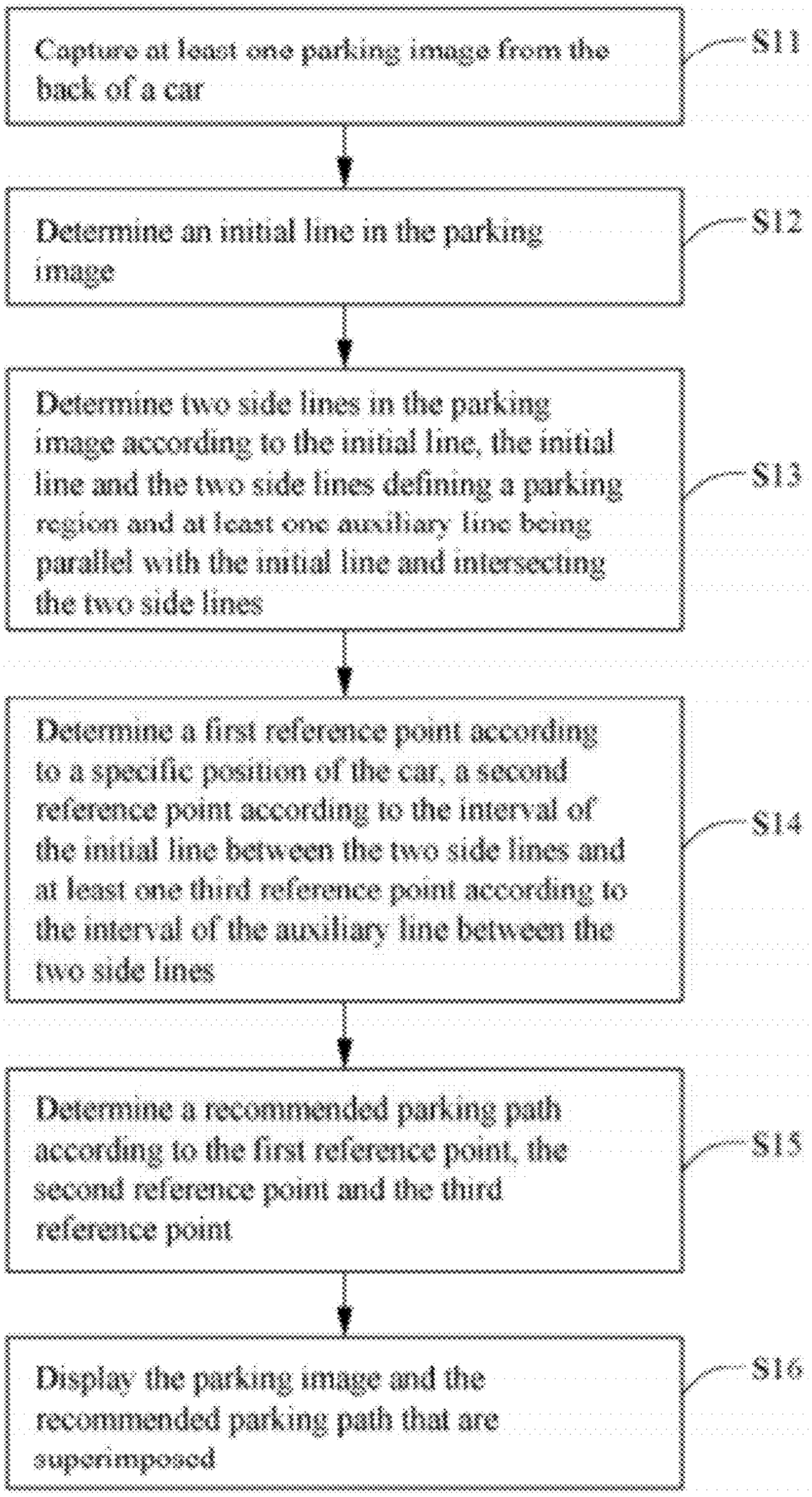
FIG. 6 is a flowchart of a parking assistance method according to one embodiment of the present invention.

Even though the parking assistance method of the present invention has been briefly described, a flowchart of a parking assistance method according to one embodiment of the present invention is provided in. FIG. 6 to make the parking assistance method readily understood. Referring to FIG. 6, firstly in step S11, at least one rear parking image is captured from the back of a car. In the present embodiment, the parking image is captured by an image capture device as shown, for example, in FIG. 2. Then, the image analysis device analyzes the parking image.

Then, in step S12 to step S13, an initial line in the parking image is determined by an image processing method, and two side lines in the parking image are determined according to the initial line. The initial line and the two side lines define a parking region. Moreover, at least one auxiliary line is parallel with the initial line and intersecting the two side lines.

As a parking region is chosen, step S14 is performed to determine a first reference point according to a specific position of the car, a second reference point according to an interval of the initial line between the two side lines and at least one third reference point according to an interval of the auxiliary line between the two side lines. Then in step S15, a recommended parking path is determined according to the first reference point, the second reference point and the third reference point.

At last, in step S16, the image analysis device transmits the parking image and the recommended parking path to a display device, so that the display device is able to display the parking image and the recommended parking path that are superimposed.

Figure 7A:
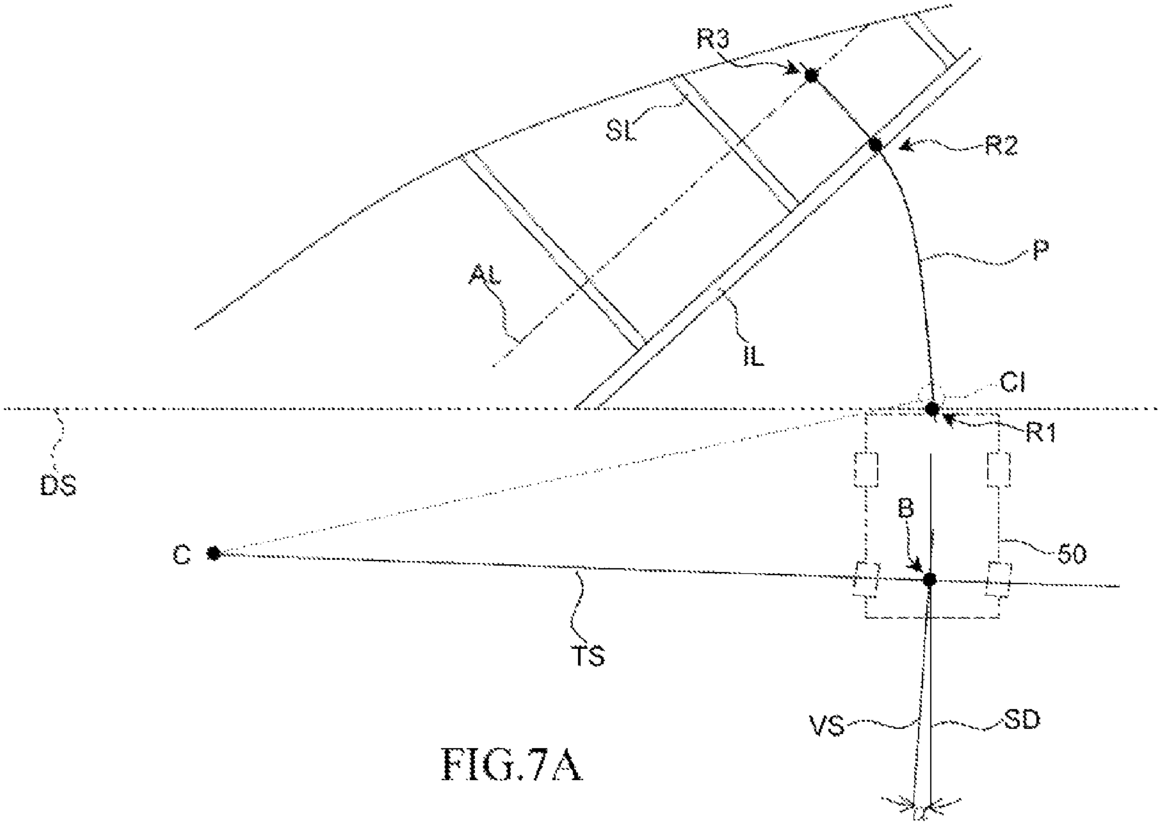
FIGS. 7A to 7C are schematic diagrams of part of the parking image in FIG. 4.

To further assist the driver to park, in the present invention, a recommended steering angle of the car is derived from the recommended parking path and the recommended steering angle transformed into a recommended number of steering turns of the steering wheel. FIG. 7A is a schematic diagram showing part of the parking image in FIG. 4. Referring to FIG. 7A, to make the car 50 move along the recommended parking path P, a recommended steering angle α of the car 50 has to be provided according to an interval CI of the recommended parking path P adjacent to the first reference point R1.

In the present embodiment, the interval CI of the recommended parking path P exhibits a curvature corresponding to a curvature center C. It is assumed that the steering center of the car 50 is located at the curvature center C. Generally, the steering angles of two front wheels of the car 50 are not the same so that the steering angles of the two front wheels are averaged as a steering angle at the canter (at point B) of the front wheel shaft of the car 50. The steering center of the car 50 is thus derived. In other words, the steering center of the car 50 is located on an extended line in the vertical direction to a direction deviated from a traveling direction of the car by a steering angle at the center of the front wheel shaft of the car 50.

In the present embodiment, the steering center of the car 50 is located at the curvature center C. Therefore, the recommended steering angle α of the car 50 can be derived from the steering line TS defined by the curvature center C and the canter (at point B) of the front wheel shaft of the car 50. In other words, the recommended steering angle α is an included angle between the travelling direction SD of the car 50 and the vertical line VS to the steering line TS.

Figure 7B:
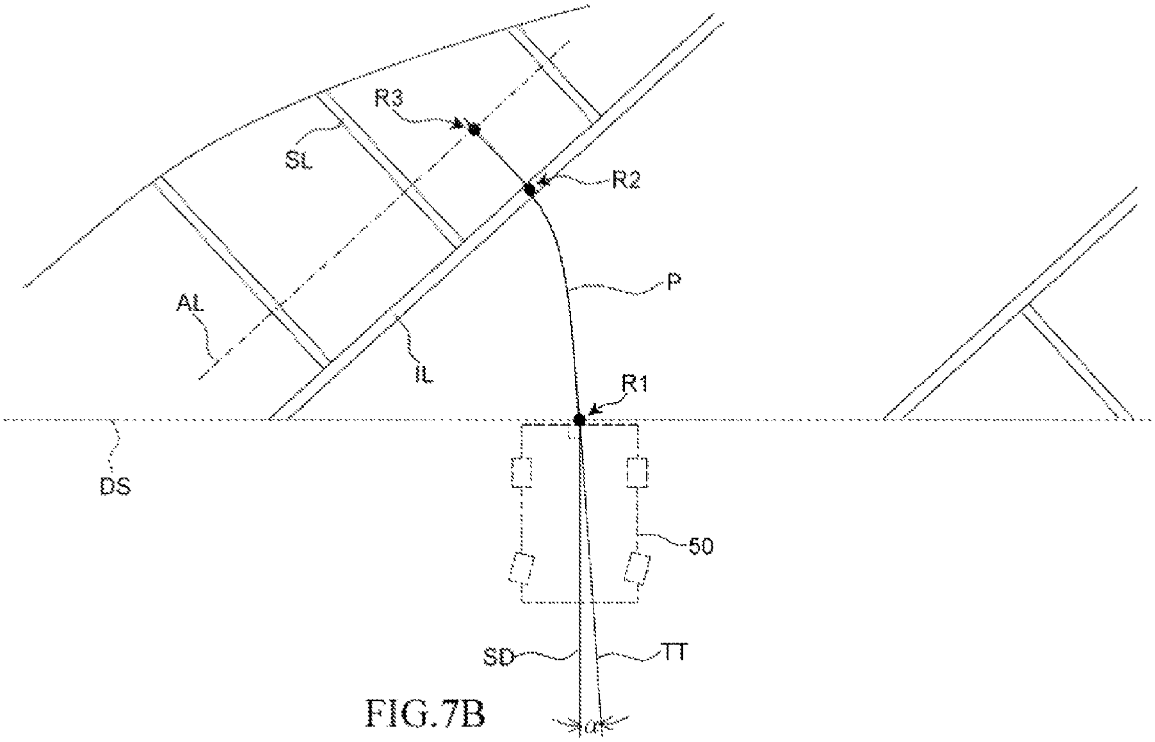

Moreover, the present invention is not limited to the method for acquiring the recommended steering angle α. Some other methods can be used to acquire the recommended steering angle α. Referring to FIG. 7B, since the recommended parking path P passes through the first reference point R1, the recommended parking path P may be provided with a steering tangential line TT at the first reference point R1. Meanwhile, the recommended steering angle α is an included angle between the steering tangential line TT and the traveling direction SD of the car 50. Moreover, referring to FIG. 7C, in another embodiment, a steering normal line TV vertical to the initial line IL is determined according to the second reference point R2. Meanwhile, the recommended steering angle α is an included angle between the steering normal line TV and the traveling direction SD of the car 50.

It is noted that, during experimental calculation, the errors resulting from the aforesaid methods are relatively negligible and thus anyone with ordinary skill in the art is able to make modifications on the methods for acquiring the recommended steering angle according to the previous descriptions within the scope of the present invention.

After the image analysis device 130 determines the recommended steering angle, a recommended number of steering turns corresponding to the steering wheel of the car 50 can be calculated according to steering parameters of the car 50. The recommended number of steering turns is then transmitted to the display device 120 so that display device 120 is able to display the recommended number of steering turns to assist the driver to park. For example, when the display device 120 displays the recommended number of steering turns as one and half turns clockwise, the driver can make two turns clockwise according to the instruction if the steering wheel of the car 50 is half turn counterclockwise.

Figure 8:
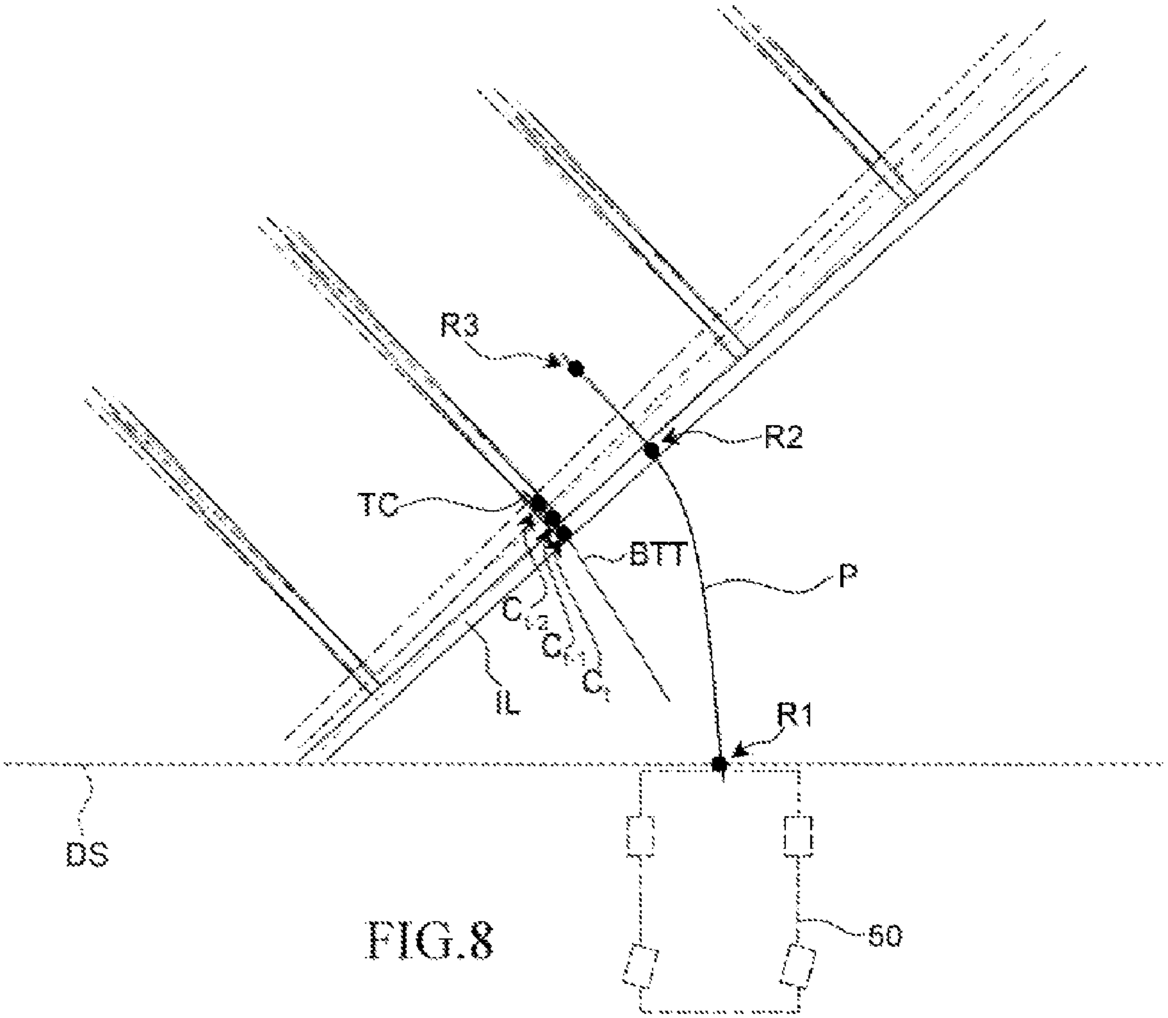
FIG. 8 is a schematic diagram showing plural time-sequential parking images that are superimposed.

When the driver is reversing the car, the image capture device 110 captures plural time-sequential parking images. FIG. 8 is a schematic diagram showing plural time-sequential parking images that are superimposed. Referring to FIG. 8, the point A at the bottom edge in the parking image (where the image capture device 110 is disposed) is always a fixed reference point in a dynamic coordinate system, while the initial line and the side lines are moving closer to the car 50. In other words, the relative movement or rotation of any feature point to the point A is equivalent to the movement or rotation of the image capture device 110 to the feature point.

In the present embodiment, feature points $C_t$, $C_{t-1}$, $C_{t-2}$, for example, are intersections of the initial line IL and the side lines SL. The feature points may also represent identifiable objects in the background of the parking image. Moreover, a trajectory curve TC is defined by these plural time-sequential feature point $C_t$, $C_{t-1}$, $C_{t-2}$, while an instantaneous steering tangential line BTT is defined at a nearest feature point $C_t$ on the trajectory curve.

Figure 7C:
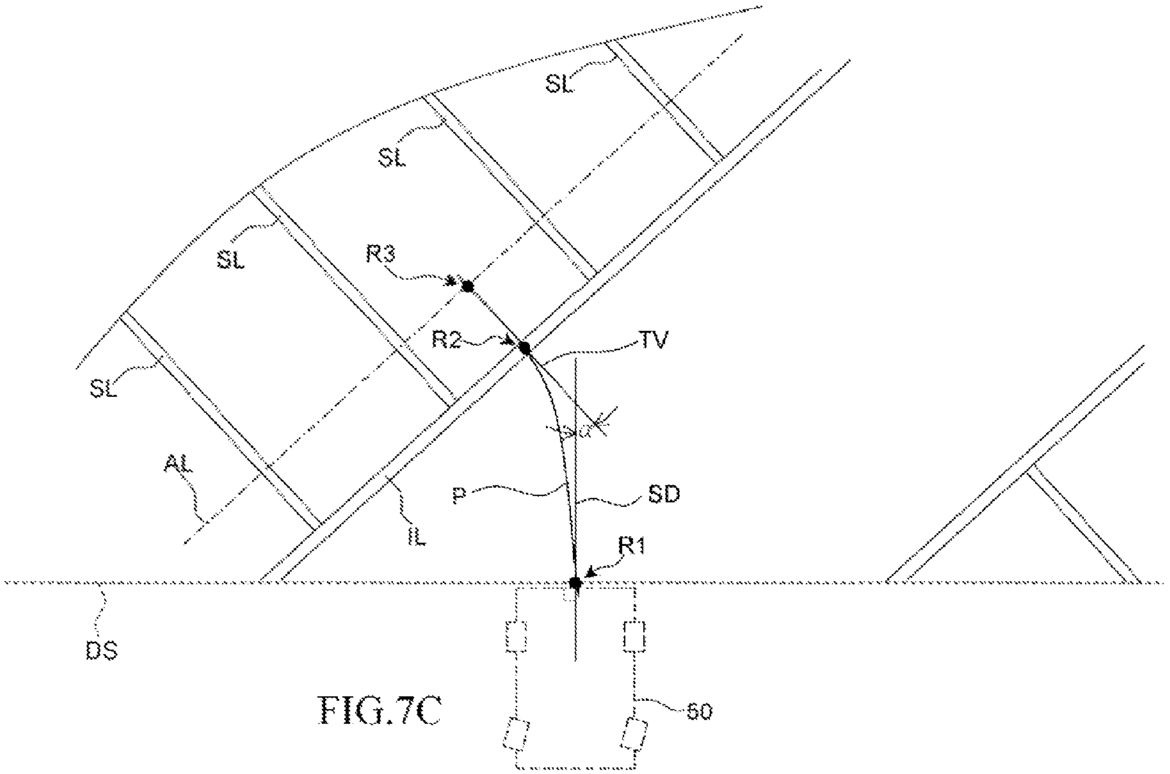

Referring to FIG. 8 and FIG. 7A to FIG. 7C, an error steering angle (not shown) is determined as the difference between actual steering angle and recommended steering angle of the car 50. In other words, the error steering angle can be an included angle between the instantaneous steering tangential line BTT and the vertical line VS (FIG. 7A), the steering tangential line TT (FIG. 7B) or the steering normal line TV (FIG. 7C). Certainly, it is readily understood by anyone with ordinary skill in the art and thus descriptions and drawings thereof are not presented herein.

Similarly, after image analysis device 130 determines the error steering angle, a recommended number of adjustment turns corresponding to the steering wheel of the car 50 can be calculated according to steering parameters of the car 50. The recommended number of adjustment turns is then transmitted to the display device 120 so that display device 120 is able to display the recommended number of adjustment turns to inform the driver of the error of the steering wheel to be corrected. For example, when the display device 120 displays the recommended number of adjustment turns as a quarter turn clockwise, the driver only has to make a quarter more turn clockwise according to the instruction to finish parking.

Moreover, if the error of the error steering angle (or the recommended number of adjustment turns corresponding thereto) is too large, the display device 120 may issue an alarm to inform the driver to avoid a fender-bender. It is noted that the present invention is not limited by the parking assistance method exemplified by car reversing even though the previous embodiments are exemplified by car reversing. In another embodiment, the present invention will be exemplified by parking along the roadside.

Figure 9:
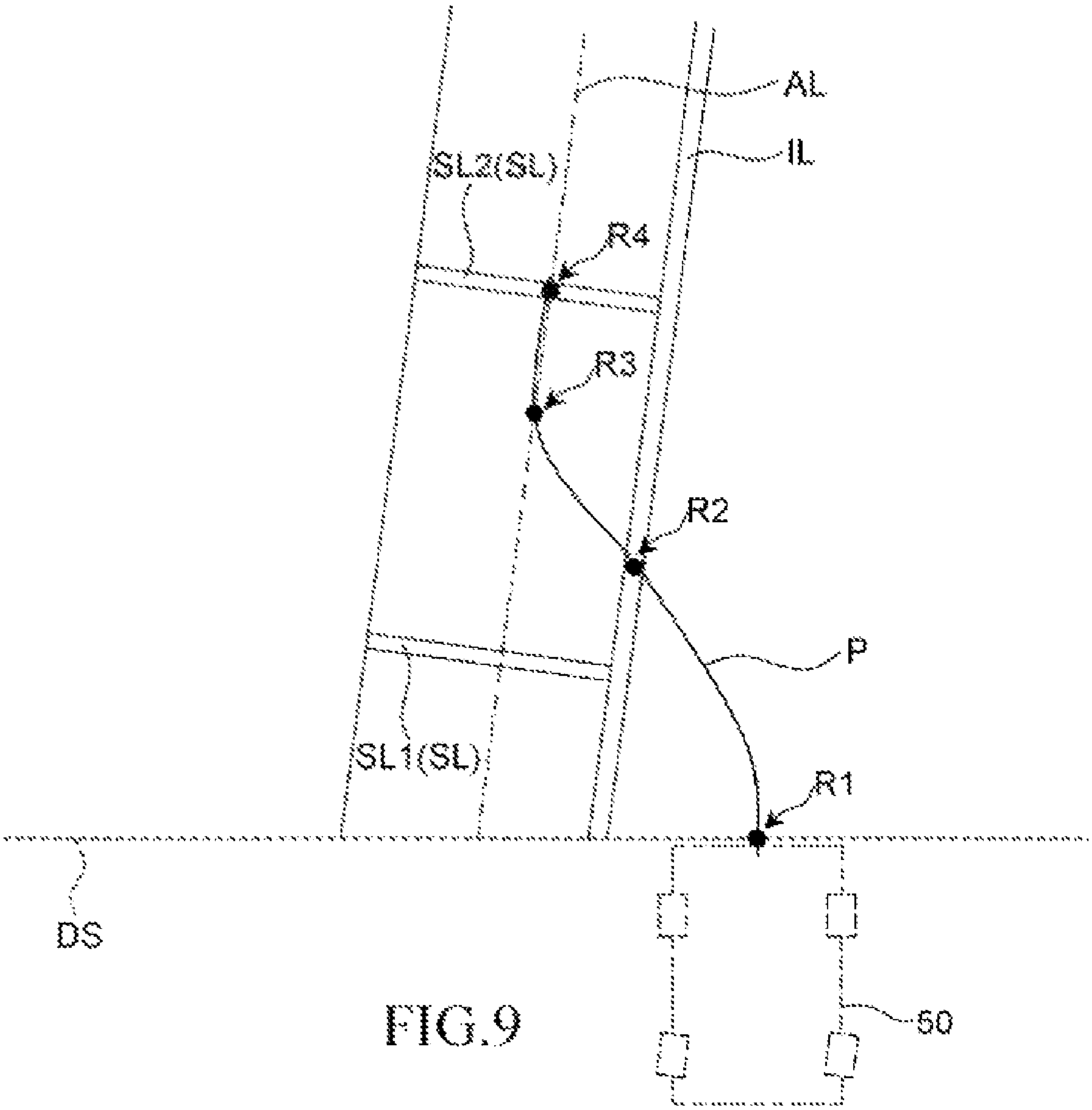
FIG. 9 is schematic diagram of a parking image in a world coordinate system according to another embodiment of the present invention.

FIG. 9 is schematic diagram of a parking image in a world coordinate system according to another embodiment of the present invention. Referring to FIG. 9, similar to the aforesaid methods, an initial line IL and plural side lines SL can be determined in present embodiment. When the distance between two neighboring side lines SL is larger than a specific distance, it is determined that the parking region is for parking along the roadside. However, the specific distance is 4 meters because the length of the parking region is within a range from 4.5 m to 5 m.

Moreover, in addition to being parallel with the initial line IL, the auxiliary line AL in the present embodiment intersects the side lines SL at the centers of the side lines SL. Moreover, when the side lines SL are not entirely shown in the image, the width of the parking region is assumed to be 3 m so as to determine the centers of the side lines SL.

Then, plural reference points will be determined to acquire a recommended parking path. Similarly, a first reference point R1 can be located at the back of the car 50 according to a specific position of the car 50; a second reference point R2 is located on an interval of the initial line IL between the side lines SL1 and SL2; and a third reference point R3 is located on an interval of the auxiliary line AL between the side lines SL1 and SL2. More particularly, the second reference point R2 is located at one third of the interval of the initial line IL between the side lines SL1 and SL2, and the third reference point R3 is located at two thirds of the interval of the auxiliary line AL between the side lines SL1 and SL2.

Moreover, a fourth reference point R4 can be further located at the center of the side line SL2. Consequently, a recommended parking path P can be determine according to the first reference point R1, the second reference point R2, the third reference point R3 and the fourth reference point R4. Similarly, the present invention is not limited to the types of curves that describe the shapes of the recommended parking path or the method for determining the recommended parking path. In the present embodiment, the recommended parking path P is a cubic curve passing through the first reference point R1, the second reference point R2, the third reference point R3 and the fourth reference point. In other words, the recommended parking path P exhibits two steering regions (one being from the first reference point R1 to the second reference point R2 and the other being from the second reference point R2 to the fourth reference point R4). It is noted that the recommended parking path P in FIG. 4 is a quadratic curve with only a steering region (from the first reference point R1 to the second reference point R2). Anyone with ordinary skill in the art can readily derive a recommended steering angle and an error steering angle of the present embodiment in FIG. 9 according to the aforesaid descriptions, which is not to be presented herein.

To sum up, the parking assistance system and method in the present invention have at least advantages such as:

1. A recommended parking path corresponding to a specific position of a car is determined according to an initial line, two side lines and an imaginary auxiliary line in a parking image to assist the driver to park.

2. A recommended number of steering turns and a recommended number of adjustment turns corresponding to the steering wheel can be determined based on the analysis of the recommended parking path so as to assist the driver to park more successfully.

3. In the present invention, only an image capture device is required without any sensor for detecting the surrounding environments or the wheels so that the lost can be significantly reduced.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A parking assistance system for being equipped on a car, the parking assistance system comprising:

an image capture device disposed on the car to capture at least one parking image from the back of the car;

a display device disposed in the car; and an image analysis device coupled to the image capture device and the display device to receive and analyze the parking image to determine an initial line in the parking image and determine two side lines in the parking image according to the initial line, the initial line and the two side lines defining a parking region and at least one auxiliary line being parallel with the initial line and intersecting the two side lines;

wherein the image analysis device determines a first reference point according to a specific position on the car, a second reference point according to an interval of the initial line between the two side lines, at least one third reference point according to an interval of the auxiliary line between the two side lines and a recommended parking path according to the first reference point, the second reference point and the third reference point, and transmits the parking image and the recommended parking path to the display device, so that the parking image and the recommended parking path are superimposed to be displayed on the display.

2. The parking assistance system as recited in claim 1, wherein the first reference point is located at the image capture device.

3. The parking assistance system as recited in claim 1, wherein the first reference point is located at the center of a rear wheel shaft of the car.

4. The parking assistance system as recited in claim 1, wherein the second reference point is located at the center of the interval of the initial line between the two side lines, and the third reference point is located at the center of the interval of the auxiliary line between the two side lines.

5. The parking assistance system as recited in claim 1, wherein the recommended parking path is a quadratic curve connecting the first reference point, the second reference point and the third reference point.

6. The parking assistance system as recited in claim 1, wherein there are plural auxiliary lines and plural third reference points corresponding thereto.

7. The parking assistance system as recited in claim 6, wherein the recommended parking path is a polynomial curve connecting the first reference point, the second reference point and the plural third reference points.

8. The parking assistance system as recited in claim 6, wherein the recommended parking path is a quadratic curve obtained by curve fitting based on the first reference point, the second reference point and the plural third reference points.

9. The parking assistance system as recited in claim 1, wherein the image analysis device determines a recommended steering angle according to an interval of the recommended parking path adjacent to the first reference point and transforms the recommended steering angle in to a recommended number of steering turns corresponding to the steering wheel of the car.

10. The parking assistance system as recited in claim 9, wherein the image analysis device transmits the recommended number of steering turns to the display device so that the display device is able to display the recommended number of steering turns.

11. The parking assistance system as recited in claim 9, wherein the interval of the recommended parking path adjacent to the first reference point corresponds to a curvature center, the curvature center and the center of a front wheel shaft of the car defining a steering line, and the recommended steering angle being an included angle between a vertical line to the steering line and a traveling direction of the car.

12. The parking assistance system as recited in claim 9, wherein a steering tangential line is defined at the first reference point on the recommended parking path, the recommended steering angle being an included angle between the steering tangential line and a traveling direction of the car.

13. The parking assistance system as recited in claim 9, wherein a steering normal line is vertical to the initial line at the second reference point, the recommended steering angle being an included angle between the steering normal line and a traveling direction of the car.

14. The parking assistance system as recited in claim 1, wherein there are plural parking image that are time-sequential so that a trajectory curve is defined by feature points in the plural parking images according to time sequence, the feature points being intersections where the initial line intersects any of the side lines.

15. The parking assistance system as recited in claim 14, wherein an instantaneous steering tangential line is defined at a nearest feature point on the trajectory curve, and an error steering angle is determined according to the instantaneous steering tangential line.

16. The parking assistance system as recited in claim 15, wherein the image analysis device transforms the error steering angle into a recommended number of adjustment turns corresponding to the steering wheel, and transmits the recommended number of adjustment turns to the display device, so that the display device is able to display the recommended number of adjustment turns.

17. A parking assistance method, comprising steps of:
- capturing at least one parking image from the back of a car;
- determining an initial line in the parking image;
- determining two side lines in the parking image according to the initial line, the initial line and the two side lines defining a parking region and at least one auxiliary line being parallel with the initial line and intersecting the two side lines;
- determining a first reference point according to a specific position of the car, a second reference point according to an interval of the initial line between the two side lines and at least one third reference point according to an interval of the auxiliary line between the two side lines;
- determining a recommended parking path according to the first reference point, the second reference point and the third reference point; and
- displaying the parking image and the recommended parking path that are superimposed.

18. The parking assistance method as recited in claim 17, wherein the step of determining the initial line in the parking image further comprises steps of:
- detecting a region to be determined that exhibits higher image intensity in the parking image;
- determining whether there is any edge feature in the region to be determined; and
- determining whether the region to be determined is a strip and whether the width of the region to be determined is smaller than a specific width.

19. The parking assistance method as recited in claim 18, wherein the step of detecting the region to be determined that exhibits higher image intensity in the parking image is performed towards the back of the car from a base point, the base point being located at the bottom edge of the parking image.

20. The parking assistance method as recited in claim 17, wherein the step of determining the two side lines in the parking image further comprises steps of:
- detecting a region to be determined that exhibits higher image intensity in the parking image;
- determining whether there is any edge feature in the region to be determined; and
- determining whether the region to be determined is a strip and whether the width of the region to be determined is smaller than a specific width; and
- determining whether the region to be determined is vertical to the initial line.

21. The parking assistance method as recited in claim 17, wherein the first reference point is located at the image capture device.

22. The parking assistance method as recited in claim 17, wherein the first reference point is located at the center of a rear wheel shaft of the car.

23. The parking assistance method as recited in claim 17, wherein the second reference point is located at the center of the interval of the initial line between the two side lines, and the third reference point is located at the center of the interval of the auxiliary line between the two side lines.

24. The parking assistance method as recited in claim 17, wherein the recommended parking path is a quadratic curve connecting the first reference point, the second reference point and the third reference point.

25. The parking assistance method as recited in claim 17, wherein there are plural auxiliary lines and plural third reference points corresponding thereto.

26. The parking assistance method as recited in claim 25, wherein the recommended parking path is a polynomial curve connecting the first reference point, the second reference point and the plural third reference points.

27. The parking assistance method as recited in claim 25, wherein the recommended parking path is a quadratic curve obtained by curve fitting based on the first reference point, the second reference point and the plural third reference points.

28. The parking assistance method as recited in claim 17, further comprising a step of determining a recommended steering angle according to an interval of the recommended parking path adjacent to the first reference point and transforming the recommended steering angle in to a recommended number of steering turns corresponding to the steering wheel of the car after the step of determining the recommended parking path.

29. The parking assistance method as recited in claim 28, wherein the step of displaying the parking image and the recommended parking path that are superimposed further comprises a step of displaying the recommended number of steering turns.

30. The parking assistance method as recited in claim 28, wherein the interval of the recommended parking path adjacent to the first reference point corresponds to a curvature center, the curvature center and the center of a front wheel shaft of the car defining a steering line, and the recommended steering angle being an included angle between a vertical line to the steering line and a traveling direction of the car.

31. The parking assistance method as recited in claim 28, wherein a steering tangential line is defined at the first reference point on the recommended parking path, the recommended steering angle being an included angle between the steering tangential line and a traveling direction of the car.

32. The parking assistance method as recited in claim 28, wherein a steering normal line is vertical to the initial line at the second reference point, the recommended steering angle being an included angle between the steering normal line and a traveling direction of the car.

33. The parking assistance method as recited in claim 17, wherein there are plural parking image that are time-sequential so that a trajectory curve is defined by feature points in the plural parking images according to time sequence, the feature points being intersections where the initial line intersects any of the side lines.

34. The parking assistance method as recited in claim 33, wherein an instantaneous steering tangential line is defined at a nearest feature point on the trajectory curve, and an error steering angle is determined according to the instantaneous steering tangential line.

35. The parking assistance method as recited in claim 34, wherein the image analysis device transforms the error steering angle into a recommended number of adjustment turns corresponding to the steering wheel, and transmits the recommended number of adjustment turns to the display device, so that the display device is able to display the recommended number of adjustment turns.

* * * * *